(12) United States Patent
Okabe et al.

(10) Patent No.: US 10,759,344 B2
(45) Date of Patent: Sep. 1, 2020

(54) EXTERNAL MIRROR DEVICE

(71) Applicant: HONDA MOTOR CO., LTD., Tokyo (JP)

(72) Inventors: Koji Okabe, Wako (JP); Yuichi Yoshii, Wako (JP); Junpei Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 15/256,127

(22) Filed: Sep. 2, 2016

(65) Prior Publication Data
US 2017/0066377 A1   Mar. 9, 2017

(30) Foreign Application Priority Data
Sep. 3, 2015  (JP) ................................. 2015-173835

(51) Int. Cl.
*B60R 1/06* (2006.01)
*H04N 5/225* (2006.01)
*B60R 1/12* (2006.01)

(52) U.S. Cl.
CPC .............. *B60R 1/06* (2013.01); *B60R 1/0602* (2013.01); *B60R 1/12* (2013.01); *H04N 5/2252* (2013.01); *B60R 2001/1253* (2013.01)

(58) Field of Classification Search
CPC ........... B60R 1/06; B60R 1/0602; B60R 1/12; B60R 2001/1253; H04N 5/2252
See application file for complete search history.

(56) References Cited

U.S. PATENT DOCUMENTS

2012/0039082 A1* 2/2012 Rodriguez Barros ......................
B60Q 1/2665
362/494
2015/0195435 A1* 7/2015 Oshida .................... B60R 11/04
348/373

FOREIGN PATENT DOCUMENTS

| CN | 104520148 A | 4/2015 |
| JP | 2009-6926 A | 1/2009 |
| WO | 2014/027587 A1 | 2/2014 |

OTHER PUBLICATIONS

Office Action dated May 29, 2018, issued in counterpart Chinese application No. 201610755864.3, with English translation. (12 pages).

(Continued)

*Primary Examiner* — Twyler L Haskins
*Assistant Examiner* — Fayez Bhuiyan
(74) *Attorney, Agent, or Firm* — Westerman, Hattori, Daniels & Adrian, LLP

(57) ABSTRACT

An external mirror device includes a housing arranged at a side of a vehicle and having an opening facing rearward of vehicle, a mirror accommodated in the opening of the housing, and a camera arranged at the housing and configured to acquire information from outside of the vehicle. With respect to the position of the camera in the front-rear direction, the camera is arranged in a rear of a contour line which includes an outline of the housing when seen from a rear of the vehicle. The housing includes a separating portion having a concave-convex shape to separate air traveling on a surface of the housing, and the separating portion is arranged at a same position as the camera in a direction along the contour line, and arranged frontward of the contour line.

10 Claims, 6 Drawing Sheets

(56) References Cited

OTHER PUBLICATIONS

Office Action dated Sep. 18, 2018, issued in counterpart Japanese application No. 2015-173835, with English translation. (6 pages).
Office Action dated Apr. 19, 2019, issued in counterpart JP Application No. 2015-173835, with English translation. (4 pages).

* cited by examiner

EXTERNAL MIRROR DEVICE

CROSS REFERENCES TO RELATED APPLICATIONS

The present application claims priority under 35 U.S.C. § 119 to Japanese Patent Application No. 2015-173835, filed Sep. 3, 2015, entitled "External Mirror Device." The contents of this application are incorporated herein by reference in their entirety.

TECHNICAL FIELD

The present disclosure relates to an improved external mirror device.

BACKGROUND

An external mirror device, which is usually arranged at the side of a vehicle and is referred to as a side mirror, includes a housing that is open toward the rear side of the vehicle, and a mirror accommodated in the opening of the housing. Some external mirror devices that include a camera at their housing for acquiring information from the outside of the vehicle have been known. Japanese Unexamined Patent Application Publication No. 2009-6926 discloses, as a conventional technique, a technique pertaining to an external mirror apparatus.

According to the external mirror device disclosed in Japanese Unexamined Patent Application Publication No. 2009-6926, a housing includes at the rear lower portion thereof a camera and a protruding portion, which protrudes downward and is arranged at a portion of the housing more frontward and above than where the camera is. In rainy weather, rain water adhered to the housing would travel along the surface of the housing toward the rear and downward where the camera is arranged. The traveling water would, at the protruding portion, drop due to traveling wind. By this, adhesion of water to the camera is suppressed.

Incidentally, depending on the type of information desired to be acquired, the camera is preferably arranged at a portion of the housing other than the lower portion, for example, at rear portion of the housing. Even in such case, it is desirable that adhesion of water to the camera is suppressed.

SUMMARY

FIG. 7 explains discovery by the present inventors. Referring to FIG. 7, FIG. 7 illustrates a portion of an exemplary external mirror device 101 as seen from the above. A camera 102 configured to acquire information from the outside of a vehicle is arranged in the rear of a contour line L, which includes the outline of a housing 103, when seen the external mirror device 101 from the rear. In other words, the camera 102 is arranged at a position that is visible when seen the housing 103 from the rear.

As an inventor of the present application among others conducted an experiment, it is found that the traveling wind hitting the housing 103 while the vehicle is in motion travels along the surface of the housing 103 and is separated off, near the contour line L, and that the pressure at an area A located in rear of the contour line L is lower than the atmospheric pressure (i.e., negative pressure is generated). An area having the lowest pressure (i.e., greatest negative pressure) will be referred to as a1 which is followed by a2 and a3 having lower pressure in an ascending order.

Accordingly, in rainy weather it is likely that the rain water adhered to the rear portion of the housing 103 will be drawn further rearward. As stated above, since the camera 102 is arranged in rear of the contour line L, there is a possibility that the rain water drawn toward the rear of the housing 103 will be adhered to the camera 102.

Thus, it is preferable to provide a technique to suppress the adhesion of rain water to the camera that is arranged in the rear portion of the housing of the external mirror device.

According to first aspect of embodiments, an external mirror device includes a housing arranged at a side of a vehicle and having an opening facing rearward of the vehicle, a mirror accommodated in the opening of the housing, and a camera arranged at the housing and configured to acquire information from outside of the vehicle, the camera is arranged in a rear of a contour line which includes an outline of the housing when seen from a rear of the vehicle, the housing includes a separating portion having a concave-convex shape to separate air traveling on a surface of the housing, and the separating portion is arranged at a same position as the camera in a direction along the contour line, and arranged frontward of the contour line.

As second aspect, a rear end of the separating portion is preferably arranged near the contour line.

As third aspect, the camera is preferably arranged in the housing outward of the mirror in a vehicle width direction, and the separating portion includes a vertical portion which extends in a vertical direction of the housing.

As fourth aspect, the separating portion preferably includes a lower extending portion which extends continuously from the vertical portion to a lower surface of the housing.

As fifth aspect, the lower extending portion preferably extends frontward from a lower end of the vertical portion.

As sixth aspect, the lower surface of the housing preferably includes an opening configured to expose a functional part arranged within the housing, and the lower extending portion is preferably connected with the opening portion.

According to the first aspect, a camera arranged at a housing and configured to acquire information from outside of a vehicle is arranged in rear of a contour line which includes the outline of the housing when seen from the rear of the vehicle. Further, the housing includes a separating portion that includes a concave-convex shape configured to have air traveling along the surface of the housing to separate, and the separating portion is arranged at a position same as the camera in the direction along the contour line and in front of the contour line. That is, with respect to the front-back direction of the camera arranged at the housing, the camera, the contour line, and the separating portion are arranged from rear to front.

Since the separating portion is arranged in front of the contour line, the position where traveling wind is separated off is in front of the contour line while the vehicle is in motion.

When compared to the configuration in which the housing does not include the separating portion, it is learned that the area of negative pressure occurring due to separation occurs at more frontward position in the configuration in which the housing includes the separating portion. The area with the greatest negative pressure positioned immediately after the housing shifts to front of the camera. Accordingly, in rainy weather the rain water that is adhered to the housing is more likely to be drawn frontward than where the camera is. As a result, it becomes possible to suppress the adhesion of rain water to the camera.

According to the second aspect, a rear end of the separating portion is arranged near the contour line. Therefore, an area with greater negative pressure will be positioned near the contour line. If the distance between the separating portion and the contour line becomes greater, there is a possibility that the traveling wind that is separated off due to the separating portion may adhere to the housing again, and separate off near the contour line again. In such case, since the separating of the traveling wind takes place twice: once at the separating portion and the other near the contour line, the aerodynamic performance of the external mirror device is deteriorated.

On the other hand, if the area of the negative pressure is arranged near the contour line, the traveling wind that is separated off due to the separating portion will not re-adhere to the housing near the contour line, and will remain separated and travel rearward. As a result, the aerodynamic performance of the external mirror device will be improved.

According to the third aspect, the camera is arranged further outward in a direction of the vehicle width than where the mirror is in the housing, while the separating portion includes a vertical portion that extends vertically in the housing.

The camera is arranged at a portion of the housing further outward in the vehicle width direction that where the mirror is. Accordingly, it becomes possible to reduce the vertical size of the housing, and achieve a streamlined and smooth design for the external mirror device.

In addition, the separating portion includes the vertical portion that, extends vertically in the housing. As stated above, the camera is arranged at the portion (i.e., portion further outward than where the mirror is) that extends substantially vertically in the housing. That is, the area of negative pressure is generated so as to match the extending direction of that portion (where the camera is arranged in the housing). Accordingly, it becomes possible to surely draw the rain water that, is traveling vertically to the area of negative pressure, and to more effectively suppress the adhesion of rain water to the camera.

According to the fourth aspect, the separating portion extends continuously from the vertical portion to a lower surface of the housing.

If the separating portion does not extend continuously from the vertical portion to the lower surface of the housing, there is a possibility of generating a wind blowing upward from a lower end of the separating portion. Due to such wind blowing upward, there is a possibility of water adhering to the camera.

On the other hand, when the separating portion extends continuously from, the vertical portion to the lower surface of the housing, it becomes possible to expect the generation of the wind blowing upward to be suppressed and to suppress the adhesion of water to the camera.

According to the fifth aspect, a lower extending portion extends frontward from a lower end of the vertical portion. Since the camera is arranged at the rear portion of the housing, the lower extending portion extends in a direction away from the camera. Such configuration will be operable to guide the rain water traveling from the side of the housing to the lower surface of the housing away from the camera, and surely prevent the adhesion of rain water to the camera.

According to the sixth aspect, the lower surface of the housing includes an opening portion configured to externally expose functional parts arranged inside the housing, while the lower extending portion is connected with the opening portion. The water traveling along the housing will go through the lower extending portion to the opening portion. As the water accumulated at the edge of the opening portion has no place to go, it will more likely drop from the housing. Since it becomes possible to remove water at the opening portion, it becomes possible to suppress the adhesion of water to the camera. That is, by using the opening portion configured to expose the functional parts, water can be removed.

In addition, since the water is removed from the housing at the lower surface of the housing, it will be possible to suppress the adhesion of water to the mirror.

BRIEF DESCRIPTION OF THE DRAWINGS

The advantages of the disclosure will become apparent in the following description taken in conjunction with the following drawings.

DETAILED DESCRIPTION

Figure 1:
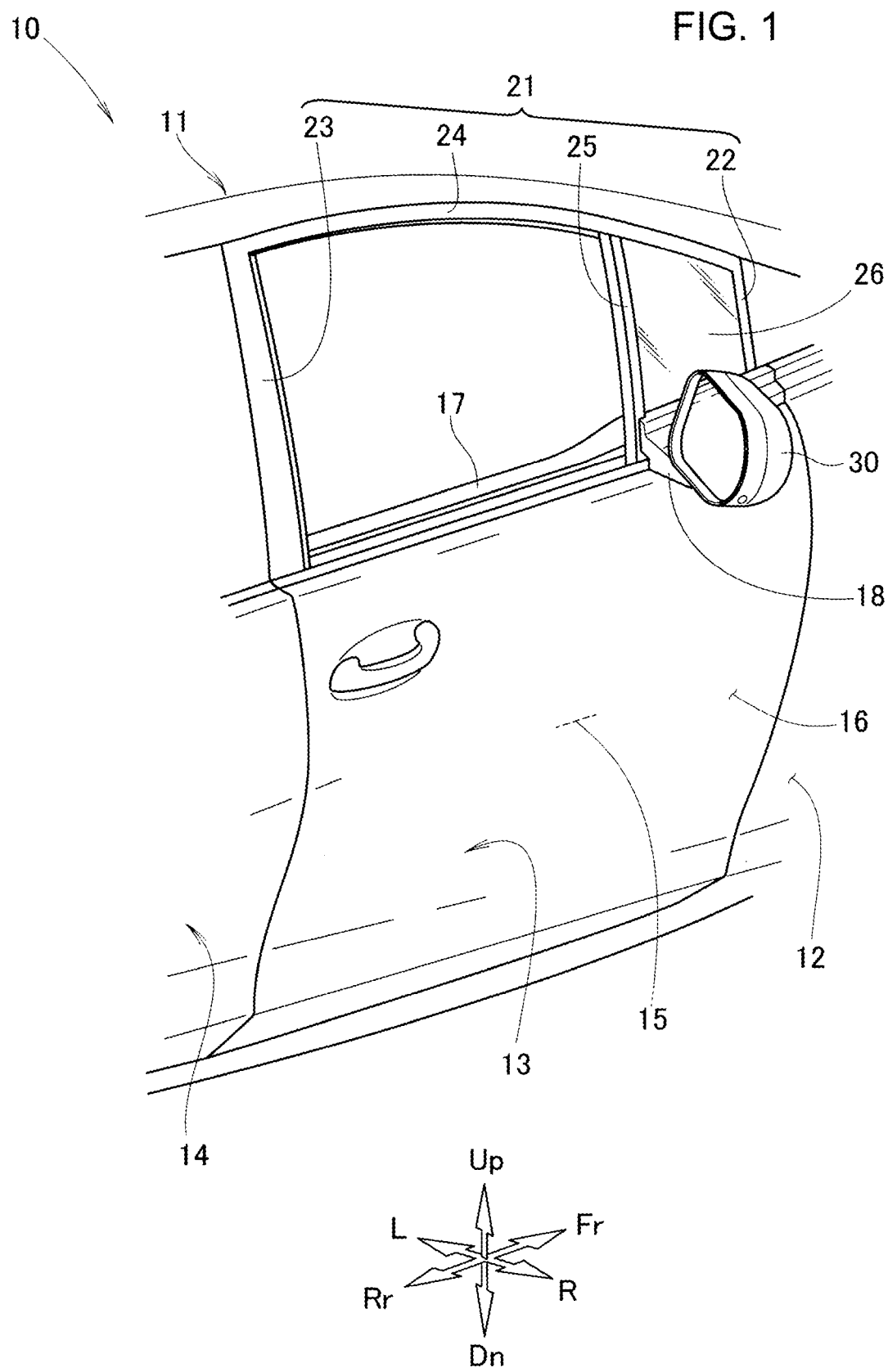
FIG. 1 illustrates a side portion of a vehicle having installed therein an external mirror device according to an embodiment of the present invention.

Hereinafter embodiments of the present disclosure will be described with reference to accompanying drawings. Note that in this description, references to directions such as left or right will be based on the perspective of the passenger of the vehicle, while references to directions such as front and back will be based on the direction the vehicle moves. Also, note that in the drawing, Fr indicates front, Rr indicates rear, L indicates left as seen from the passenger of the vehicle, R indicates right as seen from the passenger of the vehicle, Up indicates up while Dn indicates down.

Embodiment

Referring to FIG. 1, a vehicle 10 includes a fender panel 12 arranged to cover a front side portion of a vehicle body 11, a front door 13 arranged behind the fender panel 12 and on a side portion of the vehicle 11 and supported in a manner allowing it to be opened and closed, and a rear door 14 arranged in the rear of the front door 13 and supported in a manner allowing it to be opened and closed.

The front door 13 includes an outer panel 16 arranged to cover an exterior of a door main body 15, an inner panel 17 arranged to cover an interior-facing surface of the door main body 15, and a door sash 21 arranged at an upper portion of the door main body 15 to include a window frame.

The door sash 21 includes a front door sash 22 arranged at a front end of the door main body 15, a rear sash 23 arranged at a rear end of the door main body 15, an upper sash 24 arranged in a manner to connect a top end of the rear sash 23 with the upper sash 24, and a central sash 25 arranged at a space between the front door sash 22 and the rear sash 23 and arranged nearer to the front door sash 22 than to the rear sash 23. A quarter glass 26 is arranged between the front door sash 22 and the central sash 25.

The front door 13 includes a mirror support portion 18 arranged near a lower end of the quarter glass 26 to support a side mirror 30 (i.e., external mirror apparatus 30). The side mirror 30 is arranged in a manner operable to adjust its angle to the mirror support portion 18.

Figure 2:
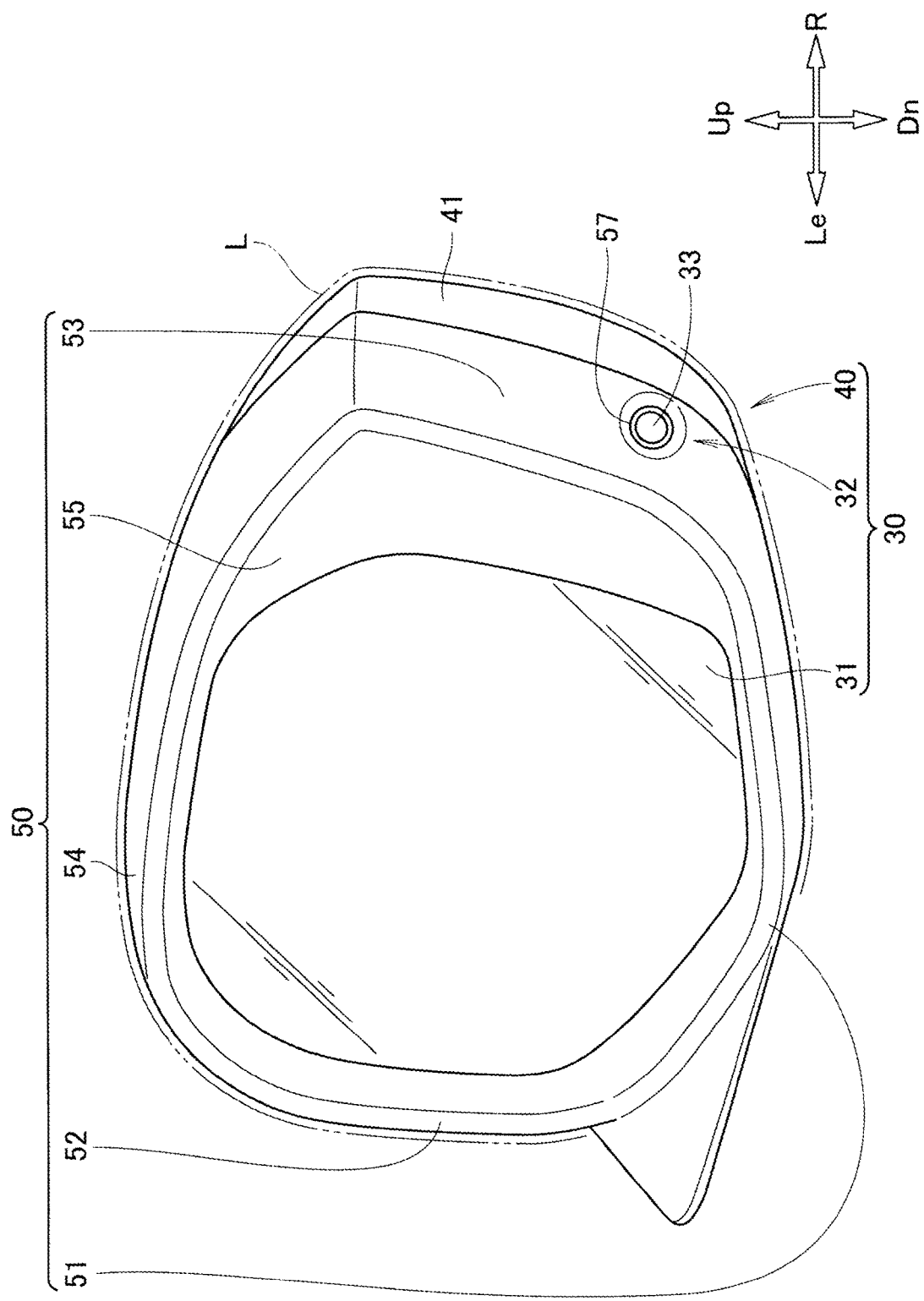
FIG. 2 is a rear view of the external mirror device illustrated in FIG. 1.

Referring to FIG. 2, FIG. 2 illustrates the side mirror 30. The side mirror 30 includes a housing 40 whose opening faces the rear of the vehicle 10 (see FIG. 1), a mirror 31 accommodated within the housing 40, a camera 32 for acquiring information from the outside of the vehicle.

The camera 32 is arranged to display to inside of the vehicle an object or the like that is located at rear and both sides of the vehicle and that cannot be verified directly by the passenger.

The housing 40 includes a housing main body 41 for supporting the mirror 31, and a visor 50 arranged in a manner surrounding the mirror 31 to restraint rain water or the like from adhering to the mirror 31. Note that the housing 40 may be fitted with another layer of cover.

The visor 50 includes a lower frame portion 51 which extends in a direction of the width of the vehicle, a left frame portion 52 which extends upward from one end of the lower frame portion 51 of the vehicle side, a right frame portion 53 which extends upward from another end of the lower frame portion 51, an upper frame portion 54 which is arranged to connect the top ends of the left frame portion 52 and the right frame portion 53, and an interior wall portion 55 which is arranged to cover the internal circumference of the lower frame portion 51 through the upper frame portion 54 in an integrated manner.

Note, in the following description, that an outline of the side mirror 30 as seen from the rear of the vehicle 10 will be referred to as a contour line L for convenience purpose. A first, opening portion 57 at which a lens 33 of the camera 32 is arranged is arranged to the rear of the contour line L. In other words, the first opening portion 57 is arranged at a portion of the housing 40 that is viewable when seen from the rear. According to the present embodiment, the first opening portion 57 is arranged at the visor 50. Detailed descriptions will be provided later.

Figure 3:
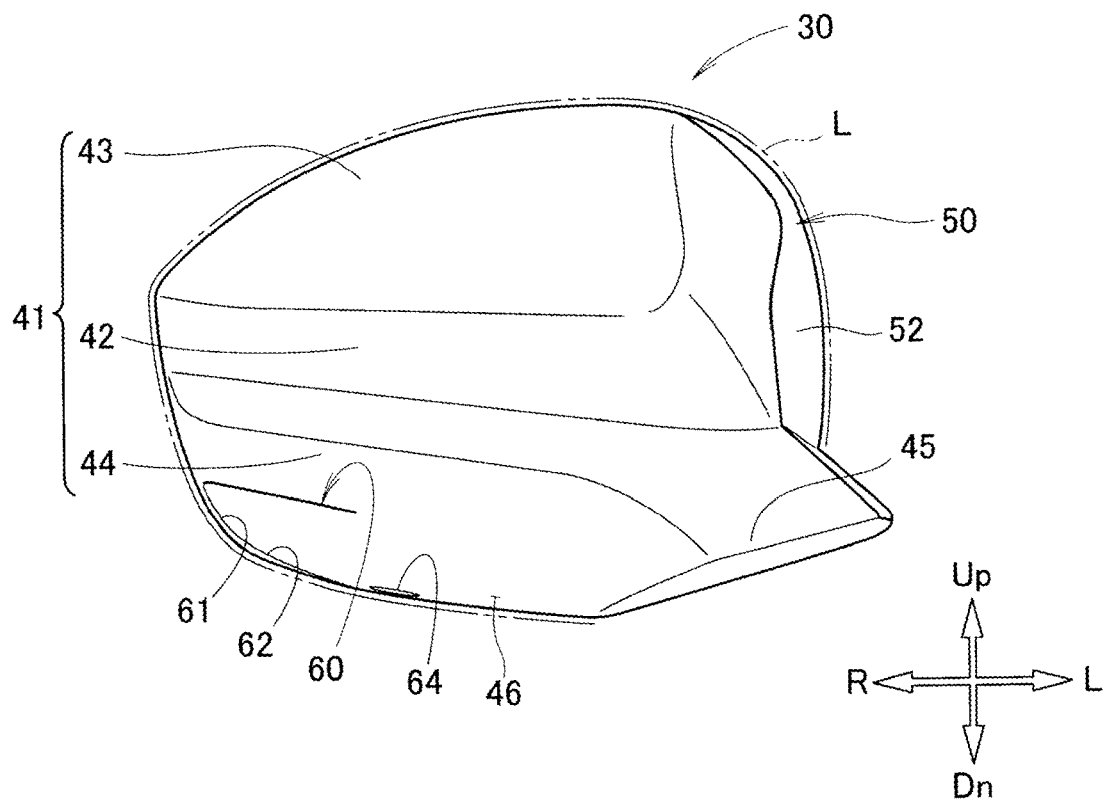
FIG. 3 is a front view of the external mirror device illustrated in FIG. 1.
Figure 4:
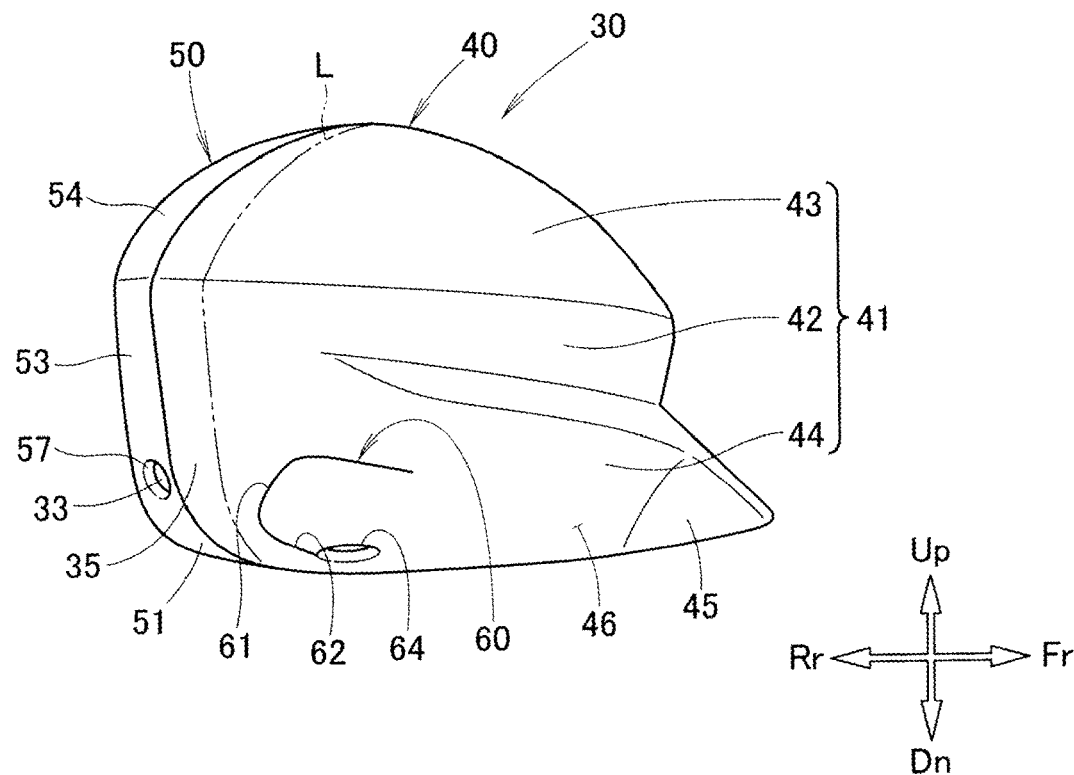
FIG. 4 is a right side view of the external mirror device illustrated in FIG. 1.

Referring to FIG. 3 and FIG. 4, FIG. 3 illustrates the side mirror 30 as seen from the front, while FIG. 4 illustrates the side mirror 30 as seen toward the vehicle from the right side of the vehicle.

The housing main body 41 includes a hemispherical shape that bulges toward the front. To be more specific, the housing main body 41 includes a body central portion 42 that extends in the direction of the width of the vehicle, a main body upper portion 43 arranged above the body central portion 42, and a main body lower portion 44 arranged below the body central portion 42 in an integrated manner.

A portion of the main body lower portion 44 located below a region where the curvature of the surface of the main body lower portion 44 changes substantially will be referred to as a lower surface 46 of the housing 40. That is to say, the lower surface 46 not only does it include the main body lower portion 44 of the housing main body 41, the lower surface 46 also includes the lower frame portion 51 of the visor 50.

A left end of the main body lower portion 44 includes a protruding portion 45 which is arranged to connect the main body lower portion 44 and the left end of the body central portion 42 with the mirror support portion 18 (see FIG. 1).

Referring to FIG. 4, the first opening portion 57 is arranged at a lower portion (at an outer side of the mirror 31 in the width direction (see FIG. 2)) of the right frame portion 53 of the visor 50. Note that the first opening portion 57 is only required to be arranged rearward with respect to the contour line L in the housing 40. For example, the first opening portion 57 may be arranged at a housing rear end portion 35 arranged at a rear end of the housing main body 41. Further, the first opening portion 57 may be arranged at the lower frame portion 51 or the upper frame portion 54 of the visor 50.

A step portion 60 (separating portion 60) is arranged in front of the camera 32 and the contour line L so as to separate off the air flowing over the surface of the housing 40. The step portion 60 is made by creating a concaved area on the surface of the main body lower portion 44. Note that the step portion 60 (separating portion 60) is only required to include a concave-convex shape on the surface of the housing main body 41, such that the housing main body 41 may include multiple fins, or the like.

The step portion 60 includes a vertical portion 61 that extends in the vertical direction of the housing 40. The vertical width of the vertical portion 61 overlaps with the first opening portion 57 so as to cover the entire first opening portion 57. That is, an upper end of the vertical portion 61 is arranged at equal level to or above an upper end of the camera 32 (first opening portion 57), while a lower end of the vertical portion 61 is arranged at equal level to or below a lower end of the camera 32.

The vertical portion 61 (rear end of the step portion 60) is arranged near the contour line L. In particular, a rear end portion of the vertical portion 61 is arranged nearer to the contour line L than a front end portion of the vertical portion 61 is. The vertical portion 61 may include an inclined portion.

Figure 5:
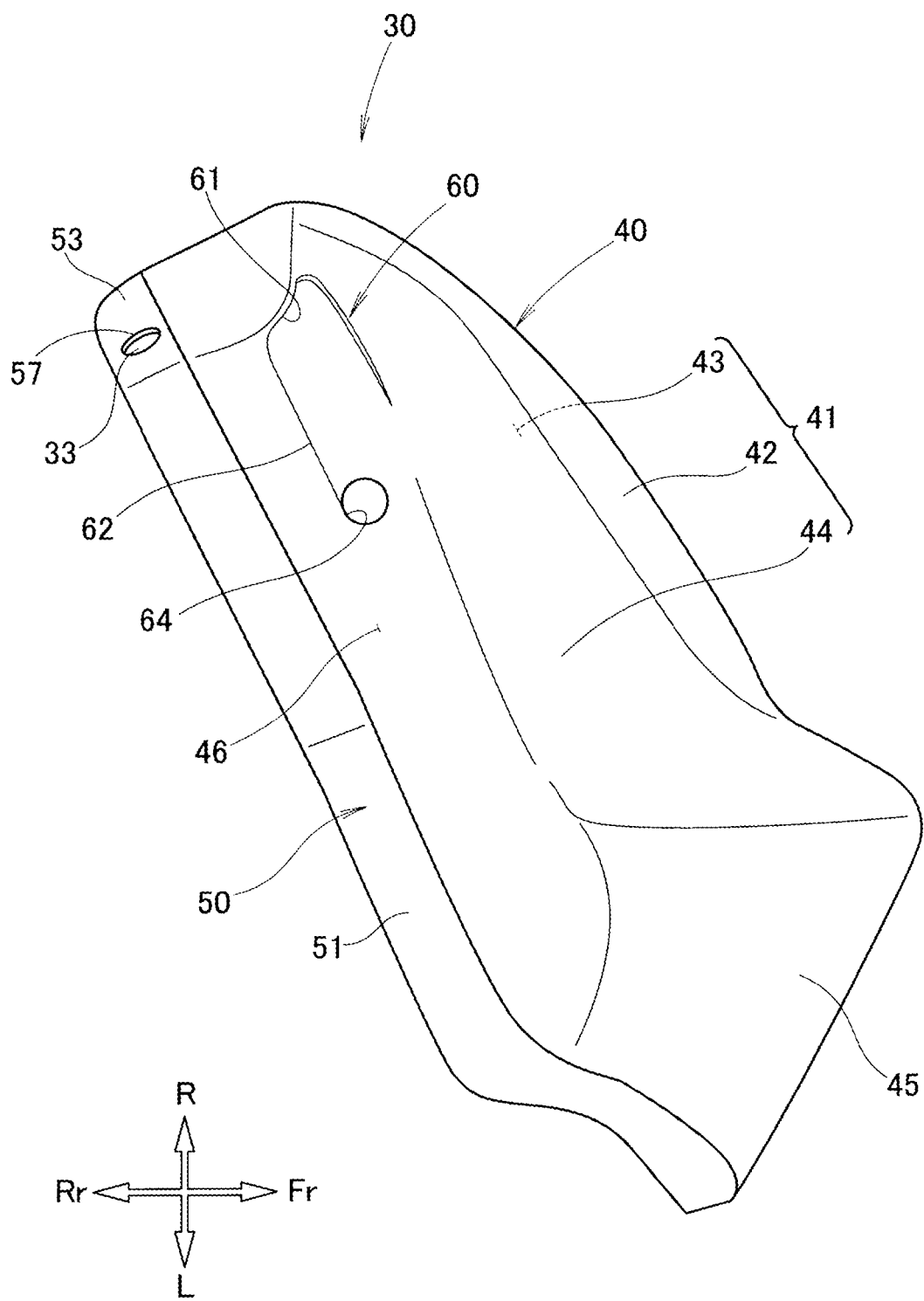
FIG. 5 is a bottom view of the external mirror device illustrated in FIG. 1.

Referring to FIG. 5, FIG. 5 illustrates the side mirror 30 as seen from below. The step portion 60 includes a lower extending portion 62 which continuously extends from the vertical portion 61 to the lower surface 46 of the housing 40. The lower extending portion 62 extends frontward from the lower end of the vertical portion 61.

The lower surface 46 of the housing 40 includes a second opening portion 64 to externally expose a camera (multi view camera, a second camera) which is arranged to light the ground and/or to photograph the lower area of the vehicle. The edge of the second opening portion 64 includes a circular shape. The lower extending portion 62 is connected with the opening portion 64. The lower extending portion 64 preferably extends along a tangential line of the second opening portion 64.

Note that the lower extending portion 62 and/or the second opening portion 64 may foe arranged at the lower frame portion 51 of the visor 50, for example.

Next, the function and effect of the present embodiment will be described.

Figure 6:
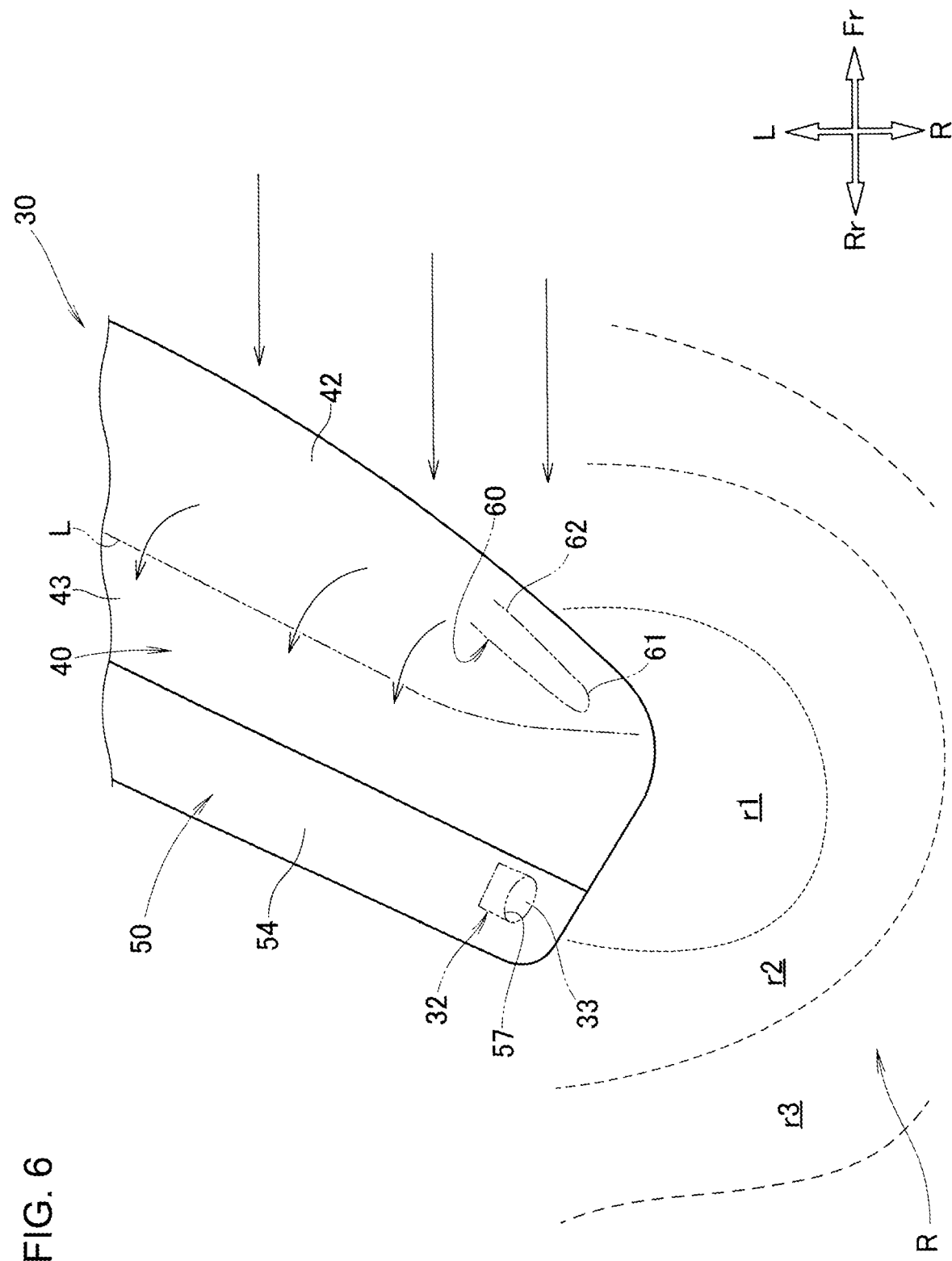
FIG. 6 is a view of operation of the external mirror device illustrated in FIG. 1.

With reference to FIG. 6, the front and back direction will be based on that of the camera 32 arranged at the visor 50 of the housing 40. FIG. 6 illustrates, from the rear to the front, the camera 32, the contour line L and the step portion 60.

Figure 7:
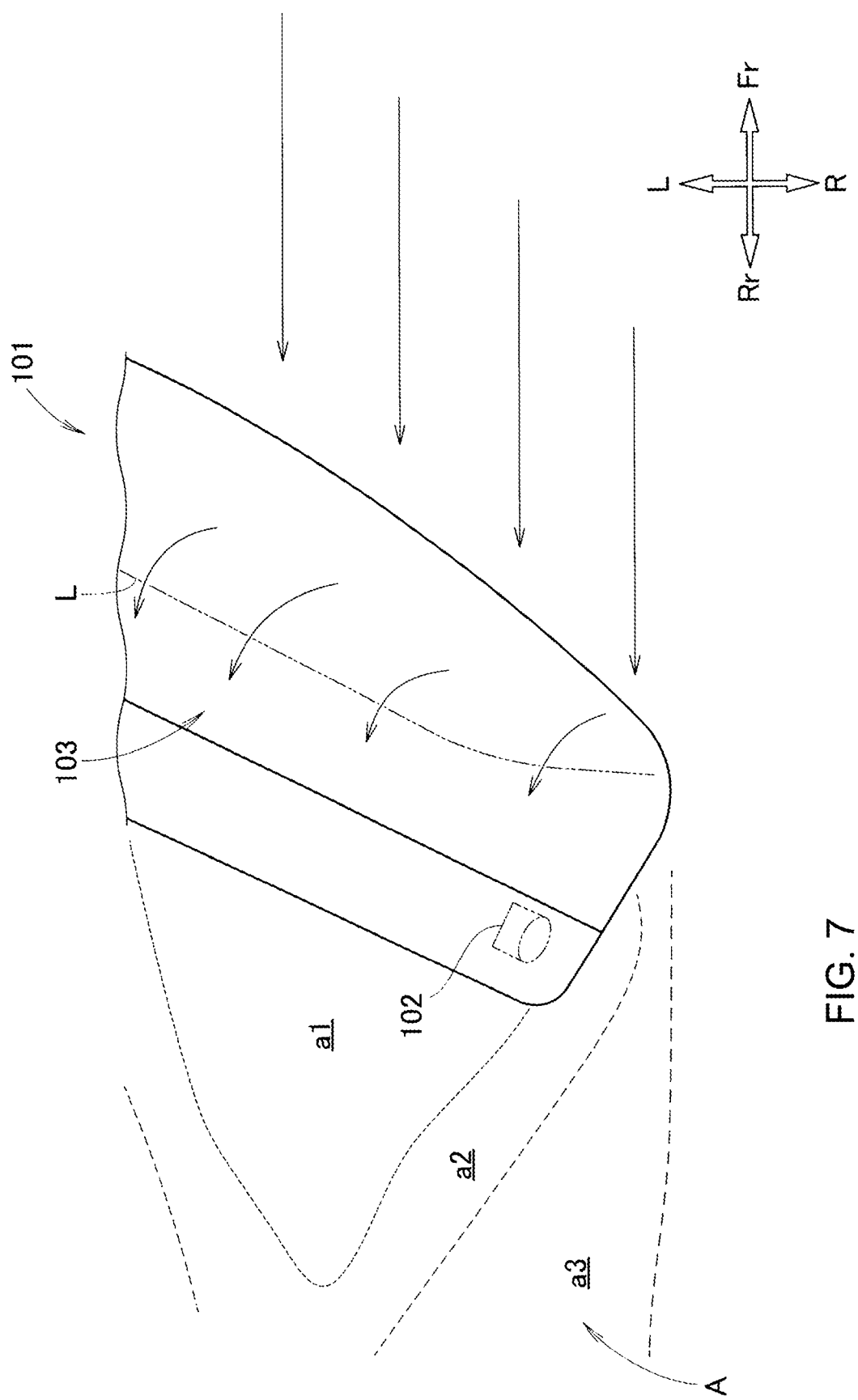
FIG. 7 is a plan view of an exemplary external mirror device.

Since the step portion 60 is positioned in front of the contour line L, the position where the traveling wind is separated off while the vehicle is in motion is in front of the contour line L. When compared to a configuration in which the step portion 60 is not included in the housing 40 (see FIG. 7), a negative pressure area R which is generated due to the separating off occurs at an area located more frontward. The negative pressure area R includes an area r1 having the largest negative pressure, and areas r2 and r3 each having less and even lesser negative pressure, respectively, than the area 1.

The area r1 which is arranged nearest to and behind the housing 40 and having the largest negative pressure is moved to a position in front of the camera 32. Due to such configuration, rain water adhered to the housing 40 are facilitated to be drawn toward the region located in front of the camera 32. As a result, it becomes possible to suppress the rain water from adhering to the lens 33 of the camera 32.

Referring also FIG. 4, the vertical portion 61 is arranged near the contour line L. To be more specific, the distance between the vertical portion 61 and the contour line L is shorter than the distance for the traveling wind separated off at the step portion 60 to adhere again to the housing 40. That is, the contour line L is arranged nearer to the step portion 60 than the portion to which the traveling wind adheres again.

If the distance between the vertical portion 61 and the contour line L is longer than the distance between the step portion 60 and the portion to which the traveling wind adheres again (i.e., in a case the contour line L is arranged away from the area the traveling wind is being separating off by the step portion 60), there is a possibility that the traveling wind re-adhered may separate off again near the contour line L. In such case, the traveling wind is separated off twice, namely at the step portion 60 and near the contour line L, which deteriorates the aerodynamic performance of the side mirror 30.

On the other hand, if the distance between the vertical portion 61 and the contour line L is shorter than the distance between the step portion 60 and the portion to which the traveling wind adheres again (i.e., in a case the contour line L is arranged within the area the traveling wind is being separated), the traveling wind separated off due to the step portion 60 will not re-adhere to the portion near the contour line L, and remains separated off and travels rearward. As a result, the aerodynamic performance of the side mirror 30 improves.

Further, the first opening portion 57 is arranged at the right frame portion 53 that extends substantially in a vertical direction in the housing 40, while the step portion 60 includes the vertical portion that extends in the vertical direction.

Since the camera 32 is arranged at the right frame portion 53 within the housing 40, it becomes possible to reduce the vertical size of the housing 40 and achieve a streamlined and smooth design on the exterior.

In addition, a negative pressure area may be created so as to match the direction (i.e., vertical direction) in which the right frame portion 53 extends, where the camera 32 is arranged. Such configuration is operable to surely draw the rain water flowing from above and below to the negative pressure area, and to effectively suppress the rain water from adhering to the camera 32.

Specifically, the upper end of the vertical portion 61 is preferably arranged above the upper end of the camera 32, while the lower end of the vertical portion 61 is preferably arranged below the lower end of the camera 32. That is, the camera 32 is arranged within the vertical width of the vertical portion 61. By this, it becomes possible to effectively suppress the rain water from adhering to the camera 32.

The step portion 60 includes the lower extending portion 62 which continuously extends from the vertical portion 61 to the lower surface 46 of the housing 40. In a case where the step portion 60 does not extend to the lower surface 46 of the housing 40, there is a possibility that wind blowing upward from the lower end of the step portion 60 may be generated. Such wind may possibly cause water to adhere to the camera 32.

Meanwhile, if the step portion 60 is arranged continuously from the side surface of the housing 40 to the lower surface 46, it possibly suppresses the blowing upwind from being generated and suppresses water from adhering to the camera 32.

Referring to FIG. 5, the lower extending portion 62 extends from the lower end of the vertical portion 61 toward the front. Since the camera 32 is arranged at the visor 50 which is arranged to the rear of the housing main body 41, the lower extending portion 62 extends in a direction away from the camera 32. Since the rain water flowing from the side of the housing 40 to the lower surface 46 can be directed to the direction that is away from the camera 32, it becomes surely possible to prevent the rain water from adhering to camera 32.

Further, the lower surface 46 of the housing 40 includes the second opening portion 64 which is arranged to expose the light and camera (second camera), while the lower extending portion 62 is connected with the second opening portion 64. The water traveling along the housing 40 goes through the lower extending portion 62, and travels to the second opening portion 64. The water that is accumulated at the edge of the second opening portion 64 has nowhere to go and tends to drop. Since the second opening portion 64 allows the water adhered to the housing 40 surely to drop, it becomes possible to suppress the water from adhering to the camera 32.

That is, the second opening portion 64, which is arranged to expose the functional parts, is operable to remove water. Accordingly, it eliminates the need to include additional part to remove water. This simplifies the manufacturing process of the side mirror 30 without compromising the appearance of the side mirror 30.

In particular, according to the present embodiment the second opening portion 64 includes a circular opening, while the lower extending portion 62 extends along the tangent line of the second opening portion 64. Accordingly, it becomes possible to suppress water drops from adhering to the camera 32, while it also becomes possible to suppress water drops from adhering to the second camera and/or the light.

Note that although the present embodiment described an example with the side mirror that is arranged on the right side of the vehicle, the present embodiment may be arranged on the side mirror arranged on the left side of the vehicle.

An external mirror apparatus according to the present disclosure is suitable for mounting on a passenger vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An external mirror device comprising:
a housing disposed on a side of a vehicle and having an opening facing rearward of the vehicle;

a mirror accommodated in the opening of the housing; and a camera provided to the housing and configured to acquire information from outside of the vehicle, wherein with respect to a position of the camera in a front-rear direction of the vehicle, the camera is arranged in a rear of a contour line defined by an outer limit of the housing when seen from a rear of the vehicle, the housing includes a separating portion having at least one of a concave shape and a convex shape to separate air traveling on a surface of the housing therefrom, and the separating portion is arranged at a same position as the camera in a direction along the contour line, and the separating portion is disposed frontward of the contour line such that the camera, the contour line and the separating portion are arranged in this order from a rear side of the vehicle to a front side of the vehicle, wherein the separating portion and the camera are disposed at same level along a vertical direction of the housing.

2. The external mirror device according to claim 1, wherein a rear end of the separating portion is disposed in the vicinity of the contour line.

3. The external mirror device according to claim 2, wherein the camera is disposed in a portion of the housing located outward of the mirror in a vehicle width direction, and the separating portion includes a vertical portion which extends in a vertical direction in the housing.

4. The external mirror device according to claim 3, wherein the separating portion includes a lower extending portion which extends continuously from the vertical portion to a lower surface of the housing.

5. The external mirror device according to claim 4, wherein the lower extending portion extends frontward from a lower end of the vertical portion.

6. The external mirror device according to claim 4, wherein the lower surface of the housing includes an opening configured to expose a functional part contained within the housing, and the lower extending portion is connected with the opening portion.

7. The external mirror device according to claim 3, wherein the separating portion is a recess defined by the vertical portion, an upper side portion extending forward from an top end of the vertical portion and a lower side portion extending forward from a lower end of the vertical portion.

8. The external mirror device according to claim 3, wherein the vertical portion has a step shape projecting outwardly.

9. The external mirror device according to claim 6, wherein the lower extending portion extends along a tangent line of the opening.

10. A vehicle comprising the external mirror device according to claim 1.

* * * * *